United States Patent
Valavi et al.

(10) Patent No.: US 7,039,712 B2
(45) Date of Patent: May 2, 2006

(54) NETWORK CONNECTION SETUP PROCEDURE FOR TRAFFIC ADMISSION CONTROL AND IMPLICIT NETWORK BANDWIDTH RESERVATION

(75) Inventors: Anand Valavi, Sunnyvale, CA (US); Donald M. Gray, III, San Francisco, CA (US); Thomas W. Kuehnel, Fremont, CA (US)

(73) Assignee: Microsoft Corporation, Redmond, WA (US)

( * ) Notice: Subject to any disclaimer, the term of this patent is extended or adjusted under 35 U.S.C. 154(b) by 773 days.

(21) Appl. No.: 10/272,370

(22) Filed: Oct. 16, 2002

(65) Prior Publication Data

US 2004/0078460 A1   Apr. 22, 2004

(51) Int. Cl.
 *G06F 15/16* (2006.01)
(52) U.S. Cl. ............... 709/228; 709/223; 709/224; 709/227; 370/444; 370/468
(58) Field of Classification Search ........ 709/223–225, 709/227, 228; 370/322, 360, 443, 444, 468
 See application file for complete search history.

(56) References Cited

U.S. PATENT DOCUMENTS

| | | | |
|---|---|---|---|
| 4,707,693 A | | 11/1987 | Hessel |
| 5,434,848 A | | 7/1995 | Chimento, Jr. et al. |
| 5,687,167 A | * | 11/1997 | Bertin et al. ................. 370/254 |
| 6,247,061 B1 | * | 6/2001 | Douceur et al. ............ 709/240 |
| 6,690,678 B1 | * | 2/2004 | Basso et al. ................. 370/468 |
| 2003/0139187 A1 | | 7/2003 | Zhang et al. |
| 2005/0022001 A1 | * | 1/2005 | Bahl et al. ................... 713/200 |

OTHER PUBLICATIONS

Wroclawski, "Specification of the Controlled-Load Network Element Service," IETF RFC 2211, Sep. 1997, 17 pages.
Shenker et al., "Specification of Guaranteed Quality of Service," IETF RFC 2212, Sep. 1977, 18 pages.

* cited by examiner

*Primary Examiner*—Frantz B. Jean
(74) *Attorney, Agent, or Firm*—Wolf, Greenfield & Sacks, P.C.

(57) ABSTRACT

A new network connection setup procedure for network computers to set up data transmission connections over a network that implements traffic prioritization (e.g., according to IEEE 802.1p) has the effect of providing admission control and implicit bandwidth reservation. A sending network device (the "sender") that wants to initiate a new transmission over the network first enters a probing mode in which it sends data packets at a priority level that is lower than the target priority level and at a transmission rate up to a peak probing transmission rate that may be the same or slightly higher than the desired transmission rate. If the sender determines based on feedback regarding the probing transmission that the network can support a transmission at the peak probing transmission rate and the probing priority level, it switches to a steady mode in which it sends data packets at the desired transmission rate and at the target priority level.

25 Claims, 5 Drawing Sheets

NETWORK CONNECTION SETUP PROCEDURE FOR TRAFFIC ADMISSION CONTROL AND IMPLICIT NETWORK BANDWIDTH RESERVATION

TECHNICAL FIELD

This invention relates generally to computer networks, and more particularly to a way to allow computers to transfer data over a connectionless network that supports multiple service classes or priorities with certain Quality of Service (QoS) parameters without adversely affecting existing connections at selected service classes or priorities.

BACKGROUND OF THE INVENTION

As our reliance on computers for information transfer grows, the demands on computer network bandwidth also become increasingly higher. Computer networks are not only used to send traditional computer data but also voice and video data, which require a significant amount of network bandwidth. With the various applications on network nodes competing to use the network to transmit data, it is necessary to manage the use of the network bandwidth effectively to ensure that the applications get the desired quality of service (QoS) for their transmissions over the network.

As the Internet and the Internet Protocol (IP) is increasingly used to transport real-time data, like voice and video, QoS has to be provided by the underlying network. Since an IP network is a connectionless network, data packets travel independently through the network between their source and destination. To provide the Quality of Service in an Internet Protocol environment, two general approaches have been taken by the Internet Engineering Task Force (IETF) and other standardization bodies. A first approach called Integrated Services assumes explicit reservation of the network resources along the transmission path of the packet, which is similar to setting up an explicit connection throughout the network. It requires explicit signaling and maintenance of states within the network, both of which are in contradiction to the paradigms of a connectionless network. The other approach, called Differentiated Services, assigns priorities for different types of traffic, like control, voice, and video. The priority information is carried in each packet. In case of congestion, packets with the higher priority are forwarded first. This requires cooperation of all applications accessing the network to use the appropriate priorities. In addition, the network utilization should be kept low to accommodate fluctuations of the network usage. One of the priority mechanisms used in conjunction with IEEE 802 networks is commonly referred to as 802.1p. The priority level of a packet is carried in a 3-bit tag element in the header of the packet, representing one of eight priority levels. A mapping to those priorities is defined for different traffic types, like voice and video, as part of the IEEE networking standards 802.1D and 802.1Q. Typically, in a network that implements priorities, each of the network clients and network elements, such as network switches or bridges, has multiple queues associated with the different priority levels, and data packets in higher priority queues are transferred before the packets in the lower priority queues.

Traffic prioritization, however, does not guarantee that the traffic flows will go smoothly over the network. One major issue is that conflicts still exist between applications that send packets at the same priority level when the available network bandwidth is limited. Currently, priority schemes based on 802.1p have no provision for admission control and reservation of network resources. For a network client application that wants to transmit data over the network, if it simply jumps into the traffic and starts transmitting data, it may find out that there is not sufficient bandwidth available at the appropriate priority level to achieve the desired QoS. In that case, not only is the new session itself affected, it also takes away the bandwidth at that priority level already being used by traffic flows of other clients and thus adversely impacts the QoS of those flows. Even if the client can find sufficient bandwidth for its packets at the target priority level, another client that starts a new session on the network may suddenly take that bandwidth away. There is no safeguard to prevent applications from generating excessive amounts of traffic at a given priority level that can cause degradation of the transmission throughput at that priority level.

To successfully deploy applications that require certain bandwidth and delay characteristics from the underlying network, such as audio/video streaming, a mechanism for achieving some degree of bandwidth reservation and admission control (i.e., whether a client should start a new transmission) in the distributed network environment is essential. Several approaches have been proposed for admission control, but they are often too complex and cumbersome to be effective. For instance, one possible approach is to query all the clients and/or network elements to determine the current bandwidth utilization, and use the results to determine whether to allow a new transmission to be admitted into the network. That approach would require the implementation of new protocols and knowledge of the network topology and details of the technology used on network segments between the sender and the receiver. Such requirements are not practical in real deployments of computer networks.

Thus, what is needed is a simple yet effective way to achieve admission control and bandwidth reservation for network transmissions, without imposing excessive overhead and burden on the network clients.

SUMMARY OF THE INVENTION

In view of the foregoing, the present invention provides a new network connection setup procedure that, when followed by computerized devices that want to transmit data over a network that implements traffic prioritization (e.g., according to 802.1p), has the effect of providing admission control and implicit bandwidth reservation. The connection setup procedure requires a sending device (or "sender") that wants to initiate a transmission to first probe whether there is sufficient bandwidth at the target priority level. The probing is done in a gracious way so as to avoid adversely affecting the bandwidth already in use by other devices at the target priority level. Specifically, instead of starting its transmission directly at the desired transmission rate and the target priority level, the sender begins in a probing mode in which it sends data packets at a priority level that is lower than the target priority level and at a transmission rate up to a maximum probing transmission rate, which may be the same or slightly higher than the target transmission rate. While in this probing mode, the sender receives feedback from the receiver as to whether the network can support the transmission at the current transmission rate and priority level. If the sender determines that the network can support a transmission at the maximum probing transmission rate and the probing priority level, it switches to a steady mode in which it sends data packets at the desired transmission rate and at the target priority level. By confirming that there is sufficient bandwidth even at a lower priority level, the sender ensures that there is sufficient bandwidth available at the target priority level, and enters the traffic only when that condition is met. Thus, the sender exerts admission control on itself. In doing so, it also ensures that its transmission will not negatively affect existing traffic flows at the target priority level, thereby providing an implicit bandwidth reservation effect with respect to the senders of the existing traffic flows at the target priority level. A significant advantage of this approach is that it is very simple to implement yet highly effective and robust in a distributed network environment. There is no need for each sender to know the details of the network topology or to perform complicated traffic analyses to estimate the available network bandwidth.

DETAILED DESCRIPTION OF THE INVENTION

Figure 1:
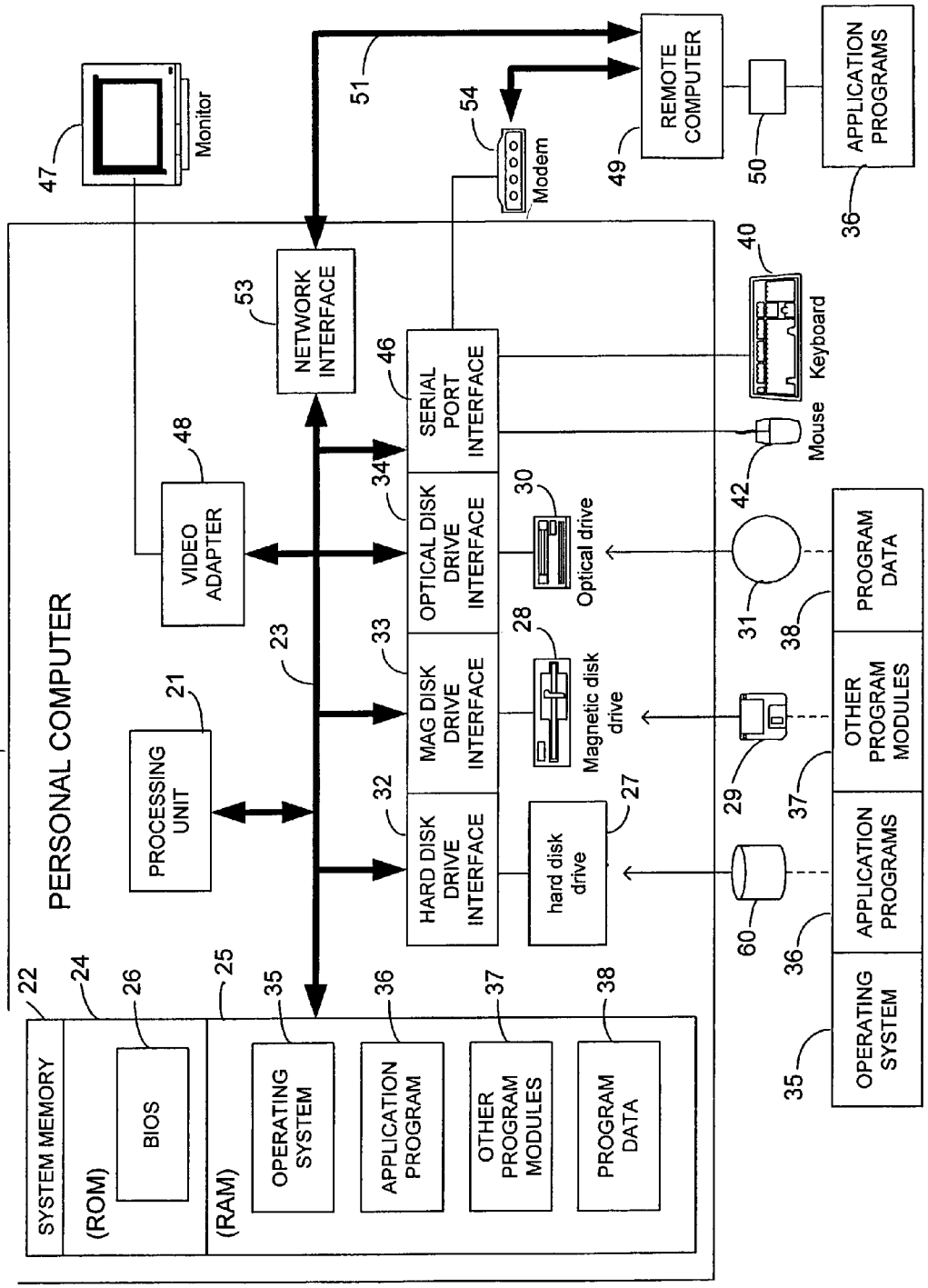
FIG. 1 is a block diagram generally illustrating an exemplary computer system on which a network computer in accordance with the present invention may be implemented.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may be practiced in distributed computing environments where tasks are performed by remote processing devices that are linked through a communications network. In a distributed computing environment, program modules may be located in both local and remote memory storage devices.

The following description begins with a description of a general-purpose computing device that may be used for implementing the network connection setup procedure in accordance with the invention, and the invention will be described in greater detail with reference to FIGS. 2–5. Turning now to FIG. 1, a general purpose computing device is shown in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, storage area networks, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB) or a network interface card. A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Figure 2:
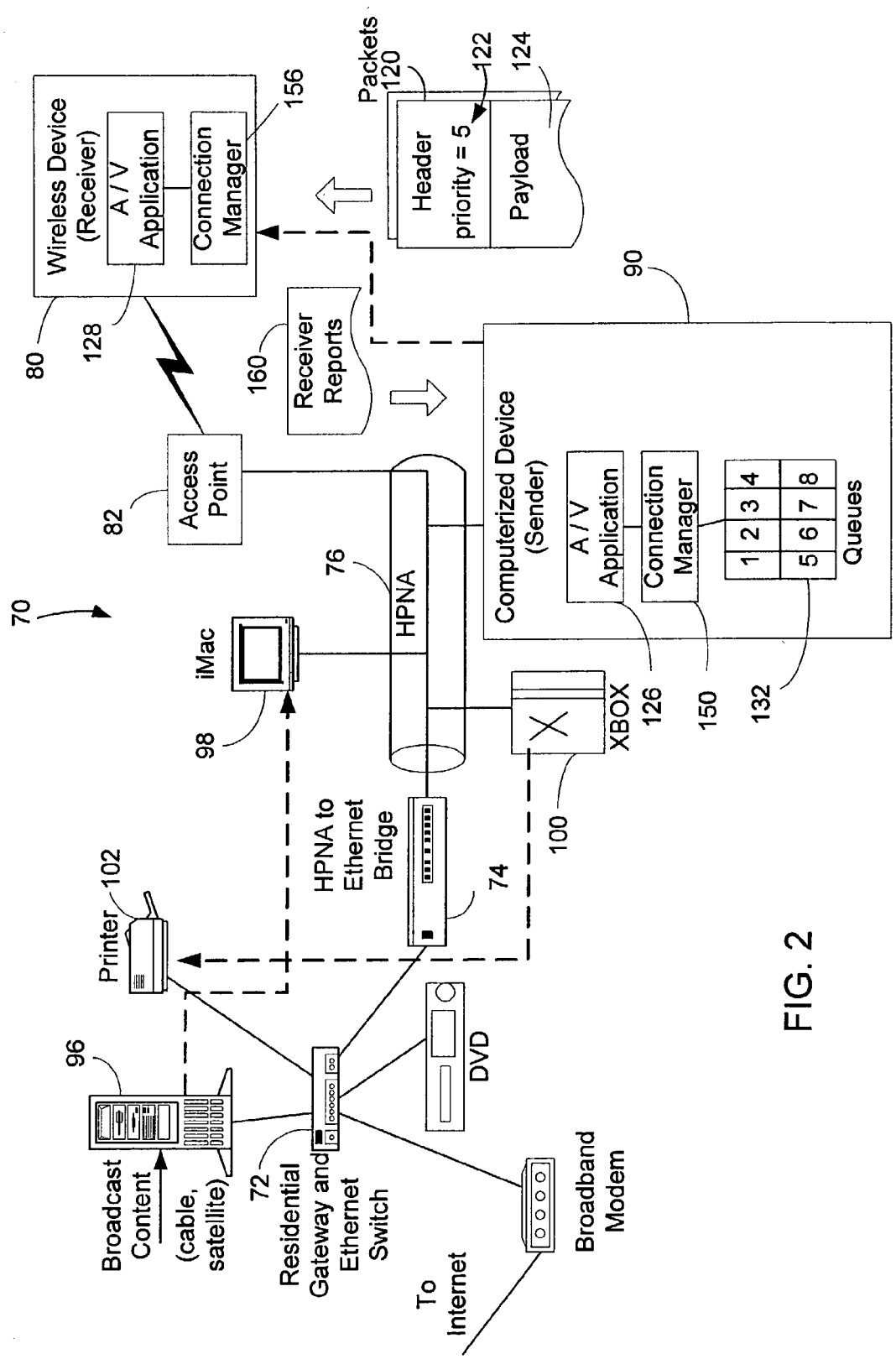
FIG. 2 is a schematic diagram showing a computer network with multiple network devices sending transmissions over the network.

Referring now to FIG. 2, the present invention is directed to a scheme for coordinating network bandwidth usage by computerized devices on a network to provide a degree of admission control (i.e., whether a device should add a new data transmission stream to the network traffic) and bandwidth reservation (i.e., that an existing data sender does not have to worry that the bandwidth it is using will be encroached by new transmission streams). The network may include many computerized devices and network elements. For illustration purposes, FIG. 2 shows an exemplary heterogeneous Home Phoneline Network Alliance (HPNA) network 70 that includes an Ethernet switch 72 connected to a HPNA to Ethernet bridge 74, and multiple devices connected to the Ethernet switch 72 and HPNA link 76. The network 70 may also include wireless devices, such as the device 80, connected to the HPNA link via an access point 82. At any given time, there may be multiple data transmissions being sent over the network. By way of example, as illustrated in FIG. 2, the device 90 (sender 1) is sending data to the device 80 (receiver 1), the device 96 (sender 2) is sending data to the device 98 (receiver 2), and the device 100 (sender 3) is sending data to the device 102 (receiver 3), etc., with the respective traffic flows indicated by dashed lines.

The invention is intended to operate in a network environment that supports traffic prioritization by assigning different priority levels to the communication packets being transmitted over the network. In a preferred embodiment, the network supports the 802.1p packet tagging, which is hereby incorporated in its entirety by reference. Generally, 802.1p is used to indicate a priority at the link layer according to the OSI Reference Model. According to 802.1p, the packets of a session are assigned with a priority level according to the type of data being transmitted. The priority level for a given packet to be transmitted over the network, such as the packet 120 in FIG. 2, is indicated in a priority tag 122 in the header of the packet. The priority level of the packets in a transmission stream is typically set by the application that sends the packets. For example, as illustrated in FIG. 2, an application 126 running on the computerized device 90 sends video/audio streaming packets over the network 70 to an application 128 on the device 80 for rendering, and the priority level is set by the application 126 as "5" in accordance with the 802.1Q specification for Ethernet. Typically, the sender has queues associated with different priority levels for the packets to be transmitted. Thus, as shown in FIG. 2, the sender has packet queues 132. The network elements, such as the bridge 74, also have such queues. The priority levels of the packets are used to determine which packets are to be taken out of the queue and transmitted. The packets of the highest priority will be sent before the packets of the second highest priority, and so on. Thus, packets having a priority level of "5" will be transmitted before those having the priority level of "4." Similarly, the network elements will forward those packets in their queues with higher priority levels before forwarding the packets with lower priority levels. As will be described below, based on such prioritization of transmission flows, the invention provides a bandwidth-probing scheme that effectively provides admission control and implicit bandwidth reservation for network transmissions.

Some networks support fewer transport priorities than the eight traffic priorities of 802.1p. In such a network, multiple traffic priorities of 802.1p can be mapped into each transport priority. Also, it is assumed that applications that support 802.1p will adhere to the priorities for different types of traffic data. Traffic from legacy nodes that do not support the 802.1p and thus has no priority tag is treated with a low priority (e.g., the "best effort" level according to IEEE 802.1Q).

The present invention achieves admission control and implicit bandwidth reservation for network transmissions by requiring the network devices to follow a procedure to set up a network connection for transmission. In accordance with the invention, each client on the network that wants to start a new transmission flow is required to take a "gracious" approach—it will first try to determine, via probing, whether the network has enough bandwidth available to support a new transmission at a desired transmission rate and a target priority level. As will be described in greater detail below, the probing is done in a non-intrusive way that does not negatively impact existing network transmissions at the target priority level. As a result, the scheme of the invention also provides implicit bandwidth reservation in the sense that once a sender starts its transmission it does not have to worry that its bandwidth may be seized by new transmissions from other senders on the network.

Specifically, a computer that wants to start a new transmission stream first enters a probing phase to determine whether the network has enough bandwidth to support the intended transmission rate and target priority level on the network. For a network implementing 802.1p, the target rate will be the priority level specified by the standard for the content type of the transmission. In accordance with a feature of the invention, the probing is performed at a priority level that is lower than the target priority level. In a preferred embodiment, that lower priority level for probing may be the priority level that is just below the target priority level. For example, if the target priority is "5," then the probing priority level may be set to "4."

For illustration purposes, the following description will focus on the transmission 92 between the sending device 90 and the receiving device 80 and refer to the former as the "sender" and the latter as the "receiver." In a preferred embodiment, the sender 90 has a connection manager 150, and the receiver 80 has a connection manager 156. During the probing phase, the connection manager 150 of the sender 90 establishes a connection with the connection manager 156 of the receiver 80, and then transmits data to the receiver at the lower priority level for probing. The transmission rate in this probing phase may be adjusted up to a peak probing level that is the same or slightly higher than the desired transmission rate for the "real" transmission. Setting the peak probing rate slightly higher than the desired transmission rate provides some headroom to accommodate the fluctuations in the actual transmission. The data packets 120 being transmitted in this probing phase may contain some dummy data as the payload 124. Alternatively, the data packet payload 124 may contain the real data that the application 126 wants to send to the application 128 of the receiver 80.

Based on the feedback sent back from the receiver 80, the connection manager 150 of the sender 90 determines whether there is enough bandwidth to accommodate this connection at the current transmission rate at the current priority level. If there is enough bandwidth at the lower priority and at the peak probing transmission rate, it can be assumed that the bandwidth at the target priority is sufficient for the intended transmission rate. At this point, the connection manager 150 enters a "steady state" by switching the transmission to the desired transmission rate and to the target priority level. Thus, from this point on, the transmission packets are labeled with the target priority level.

On the other hand, if the connection manager 150 at any point during the probing phase decides, based on the feedback, that there is not enough bandwidth available for transmission at the peak probing transmission rate at the lower priority level, it terminates the probing phase and assumes that there is not sufficient bandwidth for transmission at the target transmission rate and target priority level. As a result, it does not proceed with the intended transmission. In other words, the connection is rejected. At this point, the connection manager 150 may notify the application 126 that there is not enough bandwidth for the transmission. How the application 126 will react in that situation depends on the specific application and the policies set. For instance, in the case of video/audio streaming, the application 126 may try to switch to a lower encoding rate, thereby reducing the required transmission rate. The connection manager 150 then starts a new probing process with a different peak probing rate to see whether there is enough bandwidth for the lower transmission rate for this new intended transmission.

When the sender 90 finds sufficient bandwidth at a lower priority level, it can assume that there is sufficient bandwidth available at the target priority level. The concept is based on the fact that for a network with traffic prioritization, such as that according to 802.1p, the available bandwidth at a given priority level is greater than or at least equal to the available bandwidth at any lower priority level. From that, it follows that any network connection that can be accommodated at a lower priority level can be moved to a higher priority without a negative impact on existing traffic flows.

By determining that the required bandwidth is available at the lower priority level and accordingly at the target priority level before transmitting at the full rate at the target priority level, the sender exerts admission control on itself. In doing so, it ensures that its transmission at the target priority level will not negatively affect the existing flows at that priority level, thereby providing the implicit bandwidth reservation effect with respect to the senders of existing traffic flows at that priority level. Since the probing is done at a priority level lower than the target level, it is non-destructive to traffic flows at the target level, or to flows having a higher priority than the target priority. Since the other devices on the network 70 are expected to follow the same connection setup procedure, once the sender switches to the steady mode, it can expect that its transmission will not be interrupted by new transmissions put on the network by other devices.

A significant advantage of this approach is that it is very simple to implement yet highly effective and robust. There is no need for each sender to know the details of the network topology or to perform complicated analyses to estimate the available network bandwidth. It should be noted that the sender is not required to determine the absolute available bandwidth. That remains unknown. Instead, the sender is only required to probe the network to find out in a non-intrusive way whether the network can accommodate the transmission it intends to send out. It will also be appreciated that this scheme for achieving admission control and implicit bandwidth reservation works in a network that contains legacy nodes that do not support traffic prioritization. As mentioned earlier, traffic from those legacy nodes is treated with the priority for best effort traffic and thus will not interfere with the probing process of nodes that implement the present invention.

In a preferred embodiment, the feedback regarding whether there is sufficient bandwidth is by means of transmit buffer monitoring and receiver reports sent by the receiver 90 in accordance with the Real-time Transfer Control Protocol (RTCP). In response to the transmission during the probing phase and based on predetermined thresholds and intervals, the connection manager 156 of the receiver 80 periodically sends receiver reports 160 to the sender 90. Each receiver report includes a timestamp and statistical data regarding the transmission, such as the cumulative number of packets received, and the number of packets lost since the last report, etc. Using the timestamps and statistical data from the receiver reports, the connection manager 150 of the sender 90 can calculate the rate at which the packets are successfully transmitted to the receiver. By monitoring the packet queues 132, the connection manager 150 knows how many packets have been sent out during the last reporting period. Based on the data, the sender can determine whether the network has enough bandwidth to support its transmission at the current transmission rate and priority level. If the feedback information indicates a lower available bandwidth than the desired bandwidth, the connection is rejected or another action is taken in accordance with the established rules.

Figure 3:
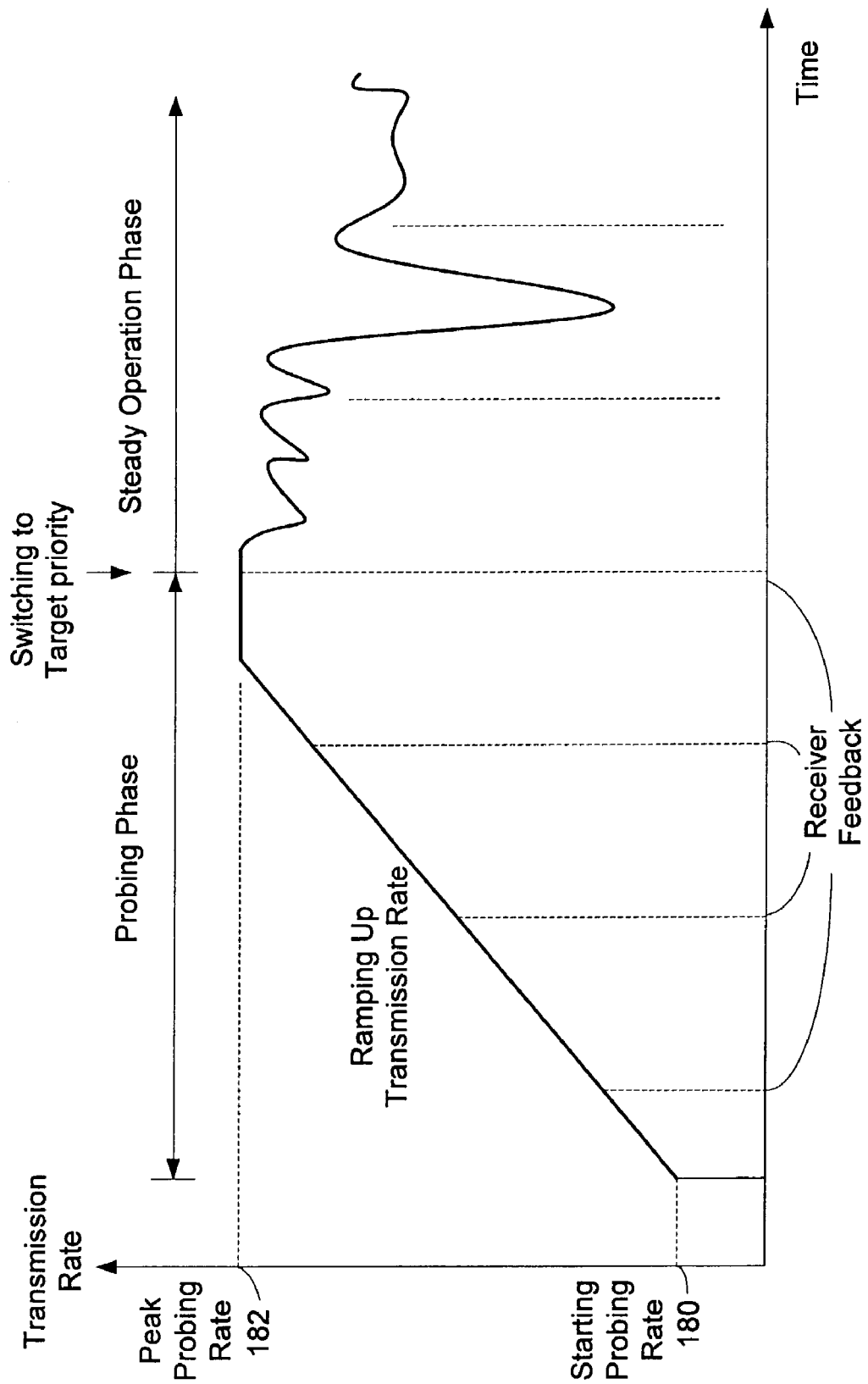
FIG. 3 is diagram showing how a data sender varies its transmission rate during a probing phase at a priority level lower than the target priority level in accordance with an embodiment of the invention.

In accordance with a feature of a preferred embodiment, during the probing phase, the sender does not immediately jump to the maximum probing transmission rate at the lower priority. Instead, as illustrated in FIG. 3, the sender starts sending the packets at a low transmission rate 180, and then gradually increases the transmission rate, such as by reducing the time intervals between the transmitted packets. By starting the probing at a low transmission rate, the sender minimizes the interruption of existing flows at priority levels lower than or equal to the probing level. In this process, as described above, the sender 90 periodically receives feedback (e.g., receiver reports) from the receiver regarding the packet receiving rate and packet loss rate, etc. At any point in this ramping process, if the connection manager 150 of the sender 90 decides from the feedback that the network is not able to support the current transmission rate, it assumes that there is not enough bandwidth for it to transmit at the desired transmission rate and at the target priority level, and terminates the probing process. The connection manager 150 may then notify the application 126 that there is no sufficient network bandwidth for the intended transmission. If, however, the probing rate is increased to the peak probing rate 182, and the feedback indicates that the network has sufficient bandwidth for that transmission rate, the connection manager 150 switches the transmission priority level to the target priority level and enters the steady mode of the transmission.

The duration of the probing phase is a tradeoff between accuracy, delay, and overhead. The longer the probing phase is, the more likely the result will be accurate, but the overhead for setting up a transmission at the target priority and the delay increase accordingly. In a preferred embodiment, the probing duration is statistically configured in the range of a few seconds to compensate for changing traffic and network characteristics.

Figure 4:
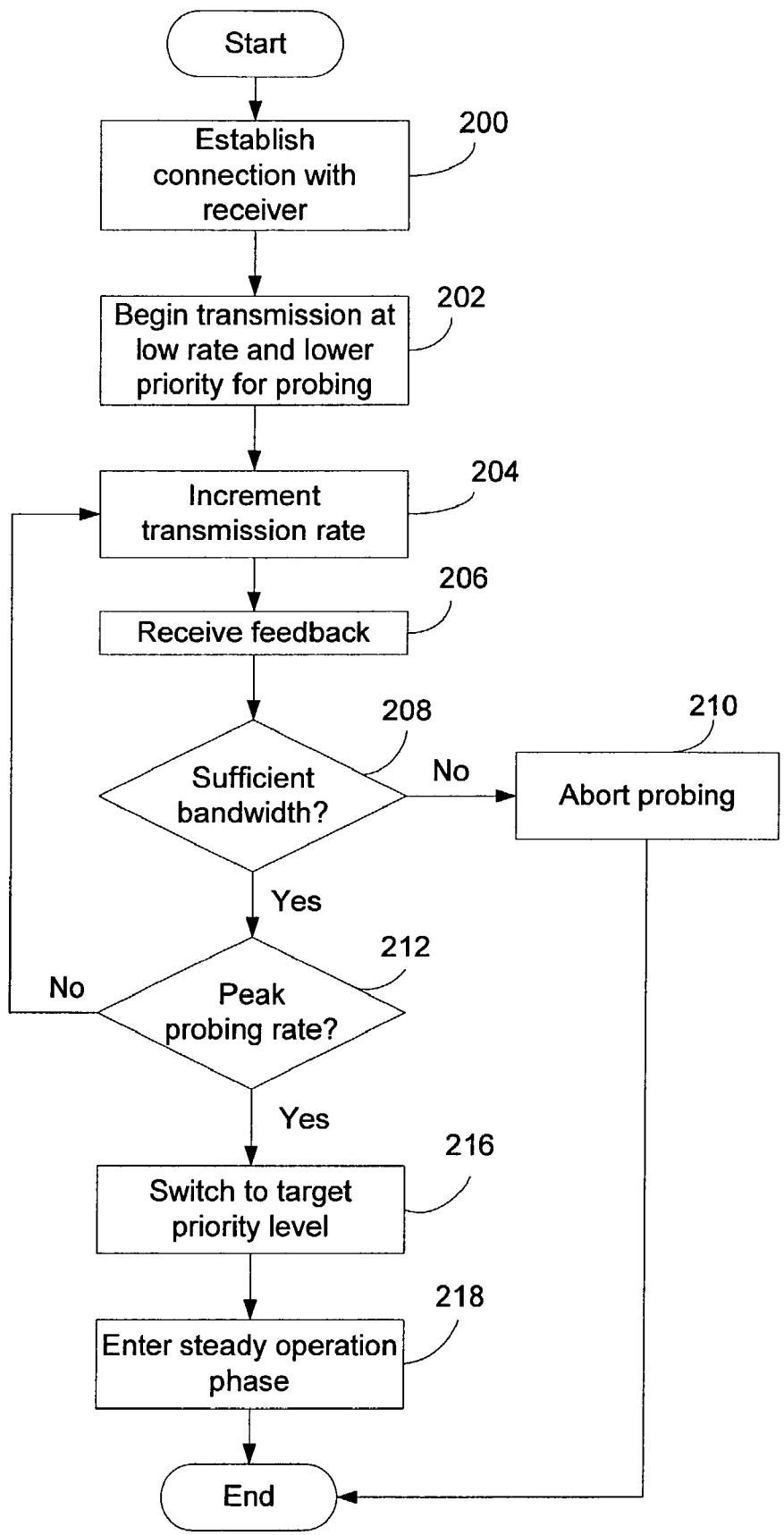
FIG. 4 is a flowchart showing a connection setup procedure for a server to establish a network transmission connection in accordance with the embodiment of FIG. 3.

The connection setup procedure for bandwidth management in the embodiment of FIG. 3 is summarized in the flowchart of FIG. 4. A sender that wants to initiate a new transmission first establishes a connection with the receiver (step 200). It then starts probing the network bandwidth at a priority level lower than the target priority level and begins transmission at a low rate (step 202). The transmission rate is increased gradually (step 204), and feedback regarding the transmission is received periodically (step 206). Based on the feedback, the sender decides whether the transmission is successful at the current transmission rate (step 208). If the network does not appear to have sufficient bandwidth for the current transmission rate, the probing is terminated (step 210). If the network can support the current transmission rate but the rate has not reached the peak probing rate (step 212), the rate is increased further (step 204). If the rate has reached the peak probing rate (step 212) and the network has sufficient bandwidth (step 208), the sender switches the transmission priority to the target priority level (step 216), and enters the steady mode operation (step 218).

Figure 5:
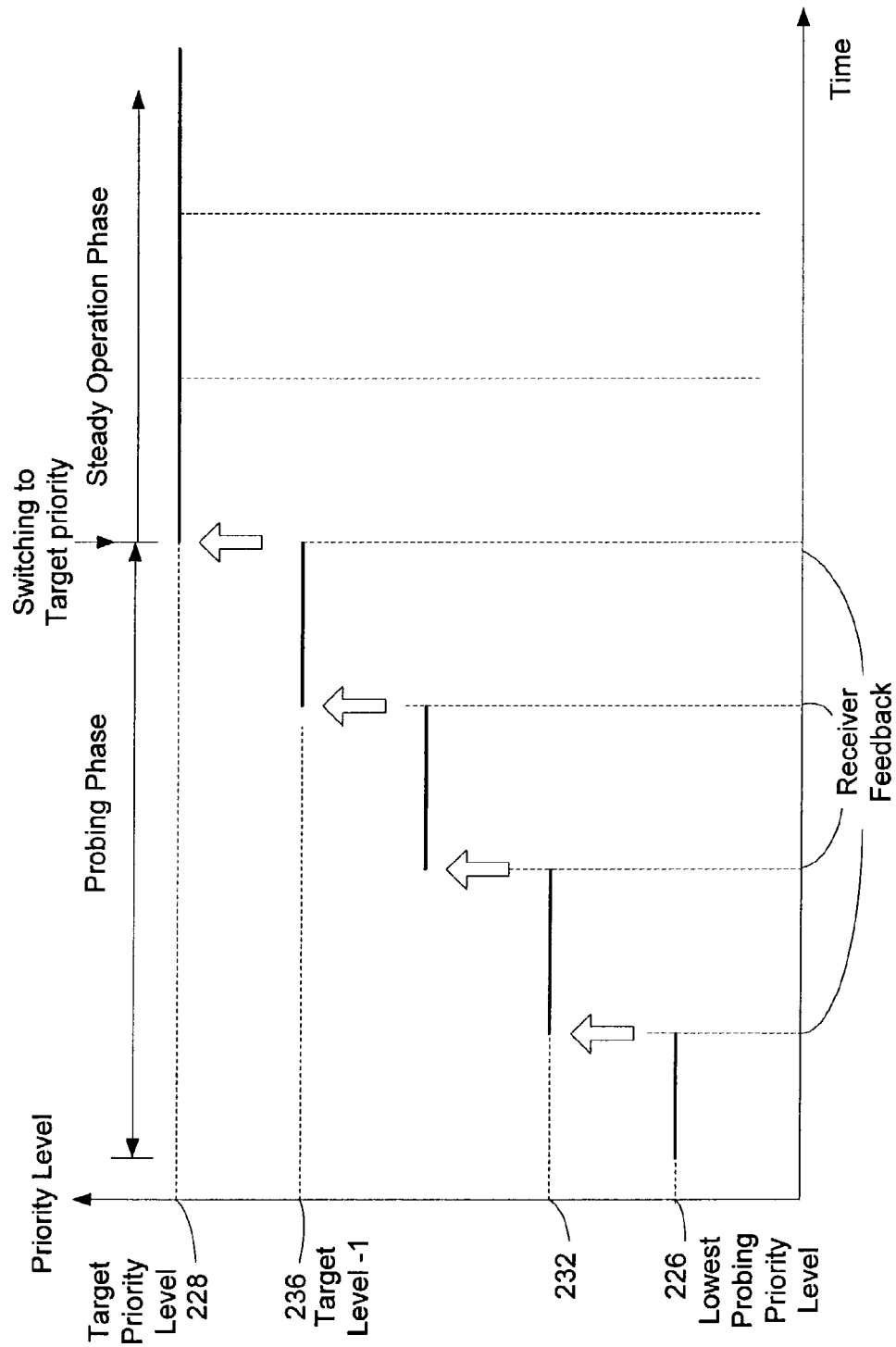
FIG. 5 is a diagram showing how a data sender steps through multiple priority levels during a probing phase for establishing a transmission connection in accordance with an alternative embodiment of the invention.

In an alternative embodiment, an even more "gracious" probing approach is used. This approach is to alleviate the effect of having fewer transport priorities implemented in a physical network than the eight priority levels defined in 802.1p. Under this approach, the probing is done in multiple steps. Referring to FIG. 5, in this embodiment, the sender in the probing phase goes through multiple lower priority levels. It starts to transmit at a low priority level 226, preferably the lowest priority level such as the "best effort" level, which is the lowest of the eight priority levels under the 802.1p standard. If the feedback shows that the probing traffic flow at the target transmission rate (or a higher rate to provide a margin) can be accommodated at this priority level, the sender then it switches directly to the target priority, i.e., into the steady phase. If the probing flow cannot be accommodated at this level, however, the sender switches to the next higher priority level 232 and continues the probing. If the probing flow can be accommodated at the present priority level, then the transmission is switched to the target priority level. This process continues until it reaches the priority level 236 just below the target priority level 232. If the network is still not capable of supporting the transmission at the desired transmission rate at this level, the sender terminates the probing process and the connection attempt has failed.

As described above, a new sender that wants to send data over the network first probes the available network bandwidth at a lower priority level. The reliability of such probing, however, is strongly affected by the behavior of the existing traffic flows. If the existing flows are highly irregular, i.e., having sharp bursts and idle times, it can be difficult for the new sender to accurately determine how much bandwidth is really available. If the probing is done in a period with a high concentration of bursts, the new sender is more likely to underestimate the available bandwidth, resulting in false rejection. On the other hand, if the probing misses the traffic bursts, the new sender may overestimate the available bandwidth, resulting in false admission. To improve the efficient usage of the network bandwidth and efficacy of the admission control, it is desirable to regulate the flows to reduce sharp peaks and valleys. To that end, the senders may be required to apply traffic shaping to their transmissions to keep the traffic flows more or less constant. For instance, for an application that transfers a live video stream to a receiver, buffering may be used to regulate the rate at which the packets are sent out, even though the rate at which new video frames are generated can vary significantly.

Similarly, policies may be implemented to handle events that interrupt the transmission flow of an existing sender. For instance, during the transmission of a video stream to a receiver for rendering, the user of the receiver may hit the STOP or PAUSE button, thereby temporarily stopping the sender from sending more video data. If the sender simply stops sending anything to the receiver, the reduction in the traffic volume may be probed by a new sender and interpreted to mean there is bandwidth available for the new sender at the associated priority level. Thus, the temporary interruption of an existing traffic flow due to various events may cause new senders to be admitted, thereby taking the bandwidth away from existing senders. Policies may be developed to determine how to handle such situations. For instance, in one implementation, it may be desirable to allow senders of established transmission connections to retain their bandwidth even though their transmissions of real data have been temporarily paused due to the occurrence of events. To that end, an existing sender may send dummy packets to occupy the bandwidth so as to prevent new senders from entering the traffic. In contrast, in another implementation, it may be desirable to ask an existing sender to give up its bandwidth when its transmission has been stopped due to the occurrence of events. In that case, when the transmission is to be resumed, the sender has to repeat the connection setup procedure, i.e., probing the network for available bandwidth at a lower priority and switching to the target priority only when there is sufficient bandwidth for its traffic flow.

In view of the many possible embodiments to which the principles of this invention may be applied, it should be recognized that the embodiments described herein with respect to the drawing figures are meant to be illustrative only and should not be taken as limiting the scope of the invention. Therefore, the invention as described herein contemplates all such embodiments as may come within the scope of the following claims and equivalents thereof.

What is claimed is:

1. A computer-readable medium having computer-executable instructions for performing steps by a network device to set up a connection with a receiver over a network for an intended data transmission at a target priority, comprising:

establishing a connection with the receiver;

transmitting data to the receiver at a probing priority that is lower than the target priority and at a transmission rate up to a peak probing rate that is equal to or greater than a desired transmission rate at the target priority;

receiving feedback regarding receipt by the receiver of the data transmitted at the probing priority;

determining, based on the feedback, whether the network has sufficient bandwidth to accommodate data transmission at the peak probing rate and the probing priority; and if the network has sufficient bandwidth for the peak probing rate at the probing priority, switching to transmitting the intended data transmission to the receiver at the target priority.

2. A computer-readable medium as in claim 1, wherein the probing priority is one level below the target priority.

3. A computer-readable medium as in claim 2, wherein the step of transmitting increments the transmission rate from a starting rate towards the peak probing rate.

4. A computer-readable medium as in claim 3, having further computer-executable instructions to perform the step of informing an application on the network device requesting the intended data transmission that no sufficient bandwidth is available if it is determined that the network does not have sufficient bandwidth to accommodate data transmission at the peak probing rate and the probing priority.

5. A computer-readable medium as in claim 1, wherein the feedback includes receiver reports from the receiver.

6. A computer-readable medium as in claim 5, wherein each receiver report includes a timestamp and number of data packets received.

7. A computer-readable medium as in claim 1, wherein the target priority is set according to IEEE 802.1p.

8. A computer-readable medium as in claim 1, having further computer-executable instructions to perform the step of:

after switching to the intended data transmission at the target priority, in case of a temporary stop of transmission due to an event, sending dummy data to maintain usage of network bandwidth.

9. A computer-readable medium as in claim 1, having further computer-executable instructions to perform the step of:

after switching to the intended data transmission at the target priority, applying traffic shaping to regulate the intended data transmission at the target priority.

10. A computer-readable medium as in claim 1, having further computer-executable instructions for performing the steps of:

if it is determined that the network cannot support data transmission at the peak probing rate and probing priority, increasing the probing priority to a next higher priority level up to one level below the target priority;

repeating the steps of transmitting data, receiving feedback, determining, and switching.

11. A method for a network device to set up a connection with a receiver for an intended data transmission at a target priority over a network, comprising:

establishing a connection with the receiver;

transmitting data to the receiver at a probing priority that is lower than the target priority and at a transmission rate up to a peak probing rate that is equal to or greater than a desired transmission rate at the target priority;

receiving feedback regarding receipt by the receiver of the data transmitted at the probing priority;

determining, based on the feedback, whether the network has sufficient bandwidth to accommodate data transmission at the peak probing rate and the probing priority; and if the network has sufficient bandwidth for the peak probing rate at the probing priority, switching to transmitting the intended data transmission to the receiver at the target priority.

12. A method as in claim 11, wherein the probing priority is one level below the target priority.

13. A method as in claim 12, wherein the step of transmitting increments the transmission rate from a starting rate towards the peak probing rate.

14. A method as in claim 13, further including the step of informing an application on the network device requesting the intended data transmission that no sufficient bandwidth is available if it is determined that the network does not have sufficient bandwidth to accommodate data transmission at the peak probing rate and the probing priority.

15. A method as in claim 11, wherein the feedback includes receiver reports from the receiver.

16. A method as in claim 15, wherein each receiver report includes a timestamp and number of data packets received.

17. A method as in claim 11, wherein the target priority is set according to IEEE 802.1p.

18. A method as in claim 11, having further including the step of:

after switching to the intended data transmission at the target priority, in case of a temporary stop of transmission due to an event, sending dummy data to maintain usage of network bandwidth.

19. A method as in claim 11, further including the step of:

after switching to the intended data transmission at the target priority, applying traffic shaping to regulate the intended data transmission at the target priority.

20. A method as in claim 11, further including the steps of:

if it is determined that the network cannot support data transmission at the peak probing rate and probing priority, increasing the probing priority to a next higher priority level up to one level below the target priority;

repeating the steps of transmitting data, receiving feedback, determining, and switching.

21. A network device comprising:

an application for generating data packets to be transmitted over a network at a target priority to a receiver on the network;

a connection manager for setting up a connection with the receiver for transmitting the data packets over the network, the connection manager being programmed to perform steps of:

establishing a connection with the receiver;

transmitting data to the receiver at a probing priority that is lower than the target priority and at a transmission rate up to a peak probing rate that is equal to or greater than a desired transmission rate at the target priority;

receiving feedback regarding receipt by the receiver of the data transmitted at the probing priority;

determining, based on the feedback, whether the network has sufficient bandwidth to accommodate data transmission at the peak probing rate and the probing priority; and if the network has sufficient bandwidth for the peak probing rate at the probing priority, switching to transmitting at the target priority rate to send the data packets to the receiver.

22. A network device as in claim 21, wherein the connection manager sets the probing priority at one level below the target priority.

23. A network device as in claim 22, wherein the connection manager increments the transmission rate at the probing priority from a starting rate towards the peak probing rate.

24. A network device as in claim 22, wherein the connection manager informs the application that no sufficient bandwidth is available if it determines that the network does not have sufficient bandwidth to accommodate data transmission at the peak probing rate and the probing priority.

25. A network device as in claim 21, wherein the target priority is set according to IEEE 802.1p.

* * * * *